2,842,605

ALKYLATION PROCESS AND CATALYST THEREFOR

Herbert R. Appell, Riverside, Ill., assignor to Universal Oil Products Company, Des Plaines, Ill., a corporation of Delaware No Drawing. Application November 24, 1954
Serial No. 471,082

22 Claims. (Cl. 260—683.15)

This invention relates to a novel process for effecting carbonium ion reactions and particularly relates to the use of the reaction product of aluminum chloride and a halogen substituted inorganic acid as a catalyst for promoting reactions involving a carbonium ion. The invention is specifically concerned with the use of new types of catalysts for increasing the rates of reaction between an alkylatable compound and an olefin-acting compound.

An object of this invention is to provide a novel catalyst for promoting carbonium ion reactions.

Another object of this invention is to produce an alkylated organic compound and particularly an alkylated isoparaffinic hydrocarbon.

A further object of this invention is to react an alkylatable compound and an olefin-acting compound in the presence of a novel catalyst.

One embodiment of this invention relates to a catalyst having the general formula $AlCl_n(R)_{3-n}$, wherein $n$ is an integer less than 3 and R is a halogen substituted inorganic acid radical, said catalyst substantially free of free aluminum chloride.

Another embodiment of this invention relates to a catalyst formed by reacting at least equimolecular proportions of a halogen substituted inorganic acid with aluminum chloride.

A further embodiment of this invention relates to a process characterized by the formation of a carbonium ion which comprises contacting a compound capable of forming a carbonium ion with a carbonium ion acceptor at reaction conditions with a catalyst comprising the reaction product of aluminum chloride and a halogen substituted inorganic acid, said catalyst substantially free of aluminum chloride.

A specific embodiment of this invention relates to a process which comprises reacting an alkylatable isoparaffin and an olefin-acting hydrocarbon at alkylating conditions in the presence of a catalyst comprising the reaction product of aluminum chloride and chlorosulfonic acid, said catalyst substantially free of aluminum chloride.

A further specific embodiment of this invention relates to a polymerization process which comprises contacting polymerizable material at polymerizing conditions with a catalyst comprising the reaction product of aluminum chloride and chlorosulfonic acid, said catalyst substantially free of aluminum chloride.

In another specific embodiment this invention relates to an isomerization process which comprises contacting isomerizable material at isomerizing conditions in the presence of a catalyst comprising the reaction product of aluminum chloride and chlorosulfonic acid, said catalyst substantially free of metal halide.

A still further specific embodiment of this invention relates to a catalyst comprising the reaction product of aluminum chloride and fluophosphoric acid, said catalyst substantially free of aluminum chloride.

Carbonium ion reactions are hydrogen transfer and alkyl transfer effected through the mechanics of forming a positive ion of a nature of $R-CH_2^+$, wherein R represents a hydrocarbon residue. Some typical examples of carbonium ion reactions include the synthesis of specific compounds such as esters by reacting an alkyl halide, for example, with an organic acid; polymerization of propylene and/or butylene to recover useful normally liquid material; production of mixtures having specific characteristics as, for example, the alkylation of isobutane or isopentane or both with propylene to form highly branched chain molecules boiling in the gasoline range and other reactions involving hydrogen or alkyl transfer as an essential result of the reaction.

In a specific aspect, however, the invention is particularly directed to alkylation reactions as specified hereinbefore in the embodiments of this invention.

Alkylatable compounds which may be used as starting materials in this process comprise hydrocarbons, hydroxy hydrocarbons, and the like. The hydrocarbons include both branched chain alkanes and cyclic hydrocarbons, the preferred cyclic hydrocarbons being those of the aromatic series. The aromatic hydrocarbons including benzene hydrocarbons such as benzene, toluene, the xylenes, ethylbenzene and other alkylbenzenes containing at least 1 replaceable nuclear hydrogen atom. Polycyclic aromatic hydrocarbons such as naphthalene, alkyl naphthalenes and other polynuclear hydrocarbons which contain at least 1 replaceable nuclear hydrogen atom are also alkylated by olefin-acting compounds as herein set forth. The hydroxy hydrocarbons include particularly the phenols, naphthols and other hydroxy aromatic hydrocarbons, including monohydroxy and polyhydroxy aromatic hydrocarbons, an example of the latter being hydroquinone. The aromatic hydrocarbons including the benzene hydrocarbons may be obtained from any source such as by the distillation of coal, by the dehydrogenation of naphthalenic hydrocarbons, by the cyclization of aliphatic hydrocarbons and by other means. The cyclic hydrocarbons also include alkylatable cycloparaffins such as alkylcyclopentane and alkylcyclohexane hydrocarbons. Branched chain paraffins such as isobutane, isopentane and other branched chain alkanes may also be charged to the alkylation treatment as herein set forth.

Suitable alkylating agents which may be charged in this process are olefin-acting compounds including monoolefins, diolefins, polyolefins, also alcohols, ethers, esters, the latter including alkyl halides, alkyl phosphates, certain alkyl sulfates and also esters of various organic carboxylic acids. The preferred alkylating agents are olefinic hydrocarbons which comprise monoolefins having one double bond per molecule and polyolefins which have more than one double bond per molecule. Monoolefins which may be utilized for alkylating aromatic hydrocarbons and other alkylatable compounds in the presence of the catalyst of this invention are either normally gaseous or normally liquid and include ethylene, propylene, butylenes, pentenes and higher normally liquid olefins, the latter including various polymers of gaseous olefins, particularly polymers having from 6 to 18 carbons atoms per molecule. Cycloolefins such as cyclopentene, cyclohexene, and various alkylcycloolefins may also be used. Other unsaturated hydrocarbons used as alkylating agents in this process include conjugated diolefins such as butadiene and isoprene, non-conjugated diolefins, other polyolefin hydrocarbons containing more than two double bonds per molecule, terpenic hydrocarbons, etc.

When employed in a polymerization process, the catalyst of this invention promotes polymerization reactions by contacting polymerizable material at a temperature of from about $-30°$ C. to about $200°$ C. and at superatmospheric pressure. The exact operating conditions depend upon the nature of the charge stock used since some charge stocks, for example isobutylene, are easier to polymerize than others, for example propylene. It will be advantageous to use high pressure in effecting this reaction since the equilibrium towards the product would be aided by the mass action principle and since the normally gaseous reactants may be maintained in the liquid phase. The pressure employed is generally super-atmospheric but moderate; in the range of from about 50 to about 500 p. s. i.

As hereinbefore mentioned, the catalyst may also be utilized in isomerization reactions. Isomerization reactions are generally effected at temperatures of from about 25° C. to about 300° C. and the pressure may vary from sub-atmospheric to super-atmospheric. The carbonium ion producing catalyst in the case of isomerization effects a rearrangement of the molecular structure to produce isomers of the original material without substantially changing the molecular weight. Isomerization reactions are useful in increasing the octane rating of straight run gasoline which is usually composed of hydrocarbon molecules having a long straight chain or slightly branched chain structure by changing the molecular structure to be more branched. Isomerization is also a useful reaction for producing a particular material. For example, p-xylene may be produced by fractionating or otherwise separating the p-xylene from an equilibrium mixture of p-xylene and the other xylene isomers and then isomerizing the separated xylene mixture in the presence of the catalyst of this invention to form an equilibrium mixture of p-xylene and the other isomers. This process may be repeated on the newly formed equilibrium mixture again and again until virtually all of the material originally present has been converted to p-xylene.

The catalyst of this invention is the reaction product of aluminum chloride and a halogen substituted inorganic acid. Aluminum chloride is a preferred metal halide since it is readily available and since the results when using aluminum chloride show that this chloride generally effects the desired reaction in a preferred manner.

Preferred catalysts comprise the reaction product of aluminum halide with chlorosulfonic acid, aluminum chloride with fluosulfonic acid, aluminum chloride with monofluophosphoric acid, aluminum chloride with difluophosphoric acid, aluminum chloride with fluoboric acid, etc.

Aluminum chloride and aluminum bromide are well known Friedel-Crafts catalysts and are known for their activity in promoting a wide variety of organic chemical reactions. These aluminum halide catalysts, however, because of their pronounced activity in promoting condensation reactions between certain organic reactants, often form sludge complexes with the reactants, especially reactants which contain a relatively reactive group, or one which is readily removed from a hydrocarbon molecule in the presence of an aluminum halide and at the reaction conditions utilized. In many instances in which the aluminum halide catalyst is utilized, extensive side reactions may occur or the reactants may polymerize or condense to such an extent that high molecular weight tarry materials are produced. Because of these undesirable characteristics of the aluminum halide catalysts, the processes in which they are employed are generally characterized by relatively high catalyst losses and relatively low efficiencies. In contrast to these aluminum halides the use of the catalyst of my invention is characterized by low catalyst losses and high efficiencies. When using the catalyst of my invention these tarry materials or acid sludges, as they are called, are greatly reduced and often are not formed. Since free Friedel-Crafts type metal halide is not an essential of the catalyst of this invention, and since it is the free halide which causes the acid sludge or tarry material, the catalyst of the present invention is preferably free of free Friedel-Crafts type metal halide; that is there are no substantial quantities or concentrations of halide as such as in the catalyst of my invention and as hereinbefore mentioned, this is an essential feature of the present invention.

The catalyst of the present invention may be in the form of a solid, liquid, in solution in a suitable solvent or impregnated into a solid absorbent material. The catalyst may be used by itself or in mixture with other suitable carbonium ion producing substances; however, as hereinbefore mentioned, the catalyst is preferably not used in admixture with free Friedel-Crafts metal halides.

When a solid absorbent carrying material is utilized, the catalyst may be impregnated into the absorbent material by using a solution of the catalyst in a suitable solvent followed by drying of the composite. The catalyst may also be directly placed on the absorbent material by contacting the absorbent material with the molten catalyst.

The absorbent carrying materials which may be used will vary somewhat their absorptive capacity, and also in their chemical and physical properties and their influence upon the catalytic effect of the mixtures. The materials which may be employed are divisible roughly into three classes. One class comprises materials of a predominately siliceous character and includes diatomaceous earth, kieselguhr and artificially prepared porous silica such as, for example, Sil-O-Cel. In the case of naturally occurring diatoms it is believed that they sometimes contain minor amounts of highly active aluminum oxide which in some instances seems to contribute to the total catalytic effect of the solid catalyst. This active material is not present in the artificially prepared forms of silica.

Another class of materials which may be employed either alone or in conjunction with the first class comprises, generally, certain members of the class of aluminum silicates and includes such naturally occurring substances as the various fuller's earths and clays such as bentonite, montmorillonite, etc. The class also includes certain artificially prepared aluminum silicates of which the product known as Tonsil is representative, this substance being in a sense a purified aluminum silicate made by treating certain selected clays with sulfuric, hydrochloric or other mineral acid and washing out the reaction products. The natural occurring substances in this general class are characterized by a high adsorptive capacity which is particularly in evidence in making up the present type catalyst, and they may also contain traces of active ingredients which may assist in producing desired effects. Again each silicate material which may be used alternatively will exert its own specific influence upon the net effectiveness of the catalyst composite which will not necessarily be identical with that of the other members of the class.

The third class of absorptive materials comprises forms of porous carbonaceous material or porous forms of carbon. Materials in this clas appear to posses particular ability to hold the catalyst so that the catalyst often has exceptionally high activity. The porous forms of carbon evidently prevent the breakdown of the catalyst. Specifically preferred materials are charcoal, coke, etc. These charcoals or coke may be used in the regular form or they may be activated forms.

The catalyst of the present invention may be prepared by mixing aluminum chloride and a halogen substituted inorganic acid at conditions to effect reaction between the two, and in the reaction at least one hydrogen halide molecule is formed.

The term halogen substituted inorganic acids is intended to include those acids in which one OH group of the acid is substituted by a halogen. Specifically preferred acids are monofluophosphoric acid, difluophosphoric acid, chlorosulfonic acid, fluosulfonic acid, monofluoboric acid, difluoboric acid, etc. The inorganic acids may be completely or partially halogenated; for example, the phosphoric acid may be a monohalophosphoric acid, or a dihalophosphoric. It is preferred that the inorganic acid be a poly-basic acid and not all of the OH groups of the oxygen-containing poly-basic inorganic acid be substituted by a halogen. When a poly-halogen substituted acid is employed the halogen atoms in the molecule may be different. The halogen substituted acid may be represented by the formula HR, wherein H is the acid hydrogen radical and R represents a halogen substituted group.

The halogen in the halogen substituted inorganic acid is preferably fluorine and/or chlorine with a bromine and iodine being less preferred.

The catalyst employed in this process is prepared conveniently by mixing the powdered aluminum chloride with the halogen substituted acid. The compounds react with the liberation of hydrogen chloride. The amounts of the individual compounds are controlled so that at least one of the halogens in the aluminum chloride remains in the final compound. For example, when reacting aluminum chloride with difluophosphoric acid, a mol to mol ratio may be maintained and the final catalyst may be represented by the formula $AlCl_2(PO_2F_2)$. In this type of reaction one molecule of hydrogen chloride is liberated from one molecule of aluminum chloride. As another example, reacting two mols of difluophosphoric acid wtih one mol of aluminum chloride, a compound having the formula $AlCl(PO_2F_2)_2$ is produced. In this reaction two molecules of hydrogen chloride are produced from one molecule of aluminum chloride. As hereinbefore mentioned, it is preferred that the third chlorine atom in the aluminum chloride molecule remains associated with the aluminum, that is, it is preferred that the third chlorine is not replaced by a difluorophosphorate radical.

The reaction between the two compounds may be performed at low or high temperatures. One very satisfactory method of preparing the catalyst is to cool the acid near its freezing point and to pour the cold acid over the aluminum halide. The resultant compound is usually a hard solid that reacts vigorously with water. Since the catalyst is affected by water it is important that the conditions in the reaction zone be maintained substantially dry and further the reactants introduced to the reaction zone should be dried before introduction thereto.

The process of this invention may be carried out in batch operation by placing an alkylatable compound and the catalyst in an autoclave and stirring while an olefin hydrocarbon is added gradually thereto, the reaction mixture being maintained at an elevated temperature at which alkylation of the hydrocarbon takes place. After the reaction has occurred, the reactor is then cooled and the alkylation product is recovered from the resultant reaction mixture.

It is preferred, however, to carry out this process in a continuous manner. This may be accomplished by placing a fixed bed of catalyst within a reactor such as a steel tube and the reactants, that is, the alkylatable compound and the olefin-acting compound are then passed continuously through the bed of catalyst at alkylation conditions. The alkylation product is then recovered from the reactor effluent and any unreacted alkylatable compound and olefin-acting compound may then be recycled to the reaction zone. Fluidized type of operation may also be employed in the presence of the aforementioned catalyst. In this method of operation, a charging stock is passed upwardly through a bed of finely divided catalyst causing the catalyst particles to become set in motion and form a fluid-like mass. Inasmuch as the alkylation reaction is exothermic, a portion of the catalyst may be withdrawn from the reaction zone either intermittently or continuously, the withdrawn catalyst is cooled and then returned to the reaction zone in order to provide a convenient method of temperature control.

Another mode of operation which may be employed is the moving bed type of operation wherein a compact bed of the catalyst is passed continuously through the reaction zone either concurrently or countercurrently to the incoming reactants. The catalyst is then passed into a cooling zone from which it is returned to the reaction zone. Another alternative type of operation comprises suspending finely divided solid catalyst in a stream of charging stock and treating said suspension under suitable conditions of temperature and pressure to produce the desired alkylation reaction.

The temperature at which the alkylation process of this invention may be conducted is dependent upon the charging stocks being employed. However, the alkylation process is generally carried out at a temperature of from about 0° C. to about 300° C. and preferably at a temperature of from about 10° C. to about 100° C. Pressure aids the reaction of alkylation and consequently this process is preferably effected at a super-atmospheric pressure which is generally not in excess of about 200 atmospheres.

In carrying out the alkylation of aromatic compounds, and particularly of aromatic hydrocarbons, an olefin-acting compound, an olefin-containing hydrocarbon fraction, or other olefin-acting compound may be commingled with a reacting aromatic compound so that the ratio of alkylatable compound to olefin-acting compound in a total mixture charged to the alkylation zone is approximately 5:1 on a molar basis. In some cases this molar ratio of alkylatable compound to olefin may be as low as about 1:1 or as high as 10:1 or even 50:1, the exact ratio being dependent somewhat on the particularly alkylatable compound and olefinic hydrocarbon or other olefin-acting material charged to the process.

Alkylated compounds formed in this process may be used as intermediates for organic synthesis or utilized for other purposes. Thus alkylated aromatic hydrocarbons which are formed from benzene and olefins or from other aromatic hydrocarbons and olefins are useful as starting materials in the production of detergents, insecticides, synthetic rubber, etc. Also certain alkylated hydrocarbons are valuable as motor fuel constituents because of their relatively high octane numbers.

The following examples are given to illustrate this invention but they are introduced with no intention of limiting unduly the generally broad scope of the invention.

EXAMPLE I

A catalyst having the formula $AlCl_2SO_3F$ was prepared as follows: 10 grams of fluosulfonic acid was cooled in Dry Ice to near −20° C. and then poured over 13.3 grams of sublimed aluminum chloride with rapid stirring. It was then placed in an oven and maintained at 100° C. for twenty minutes. The mass was allowed to cool and ground to a fine powder. This catalyst is designated catalyst A.

EXAMPLE II

A catalyst having the formula $AlCl(HSO_4)_2$ was prepared as follows: 19.6 grams of 100% sulfuric acid was cooled in Dry Ice to near 0° and poured over 13.3 grams of sublimed aluminum chloride with rapid stirring. The mass was then placed in an oven and maintained at 100° C. for twenty minutes. The mass was allowed to cool and ground to a fine powder. This catalyst is designated catalyst B.

EXAMPLE III

Each of the above prepared catalysts was separately tested to determine their individual effectiveness as alkylation catalysts. 10 grams of each of the catalysts was placed in a turbomixer equipped with a 1000 ml. stainless steel pot. The charge stock comprised the following mixture:

| | Percent |
|---|---|
| $C_2H_4$ | 0.5 |
| $C_2H_6$ | 0.2 |
| $C_3H_6$ | 16.9 |
| $C_3H_8$ | 0.8 |
| $i\text{-}C_4H_{10}$ | 80.5 |
| $n\text{-}C_4H_{10}$ | 1.1 |

The charge stock was pumped into the reactor or turbomixer at a constant rate. The amount used for each run was approximately the same and the exact amounts are shown in the Table I below. The operating conditions and results are also shown in Table I.

Table I

| Catalyst | A | B |
|---|---|---|
| Starting Temperature, °C | 28.5 | 27.0 |
| Maximum Temperature, °C | 36.0 | 32.0 |
| Pressure, p. s. i. | 410 | 415 |
| Wt. Charge | 200.4 | 198.7 |
| Wt. Liquid Product | 27.4 | 9.2 |
| Liquid Product Percent Yield Based On Olefins Charged | 96.1 | 32.5 |

This example illustrates that catalyst produced by the reaction of aluminum chloride with a halogen substituted inorganic acid is superior to one prepared using an inorganic acid which is not halogen substituted.

EXAMPLE IV

A catalyst having the formula $AlCl_2PO_2F_2$ was prepared as follows: 10.2 grams of difluophosphoric acid was cooled in Dry Ice and then poured over 13.3 grams of sublimed aluminum chloride with rapid stirring. The resultant mass was directly used as a catalyst. This catalyst is designated catalyst C.

EXAMPLE V

A catalyst having the formula $AlCl_2HPO_3F$ was prepared as follows: 10 grams of monofluophosphoric acid was added to 13.3 grams of anhydrous aluminum chloride, freshly powdered, in a 100 ml. beaker. The mass was mixed well and then placed in an oven and maintained at 100° C. for twenty minutes. It was then removed, cooled in a desiccator and then powdered. This catalyst is designated catalyst D.

EXAMPLE VI

A catalyst having the formula $AlCl_2H_3P_2O_7$ was prepared as follows. 3 grams of aluminum chloride and 3 grams of pyrophosphoric acid were ground together in a mortar. The mass at first became pasty but changed to a fairly dry solid. This catalyst is designated catalyst E.

EXAMPLE VII

Each of the catalysts C, D and E was separately tested to determine their individual effectiveness as alkylation catalysts. The charge stock and procedure were the same as outlined in Example III above. The operating conditions and results are shown below in Table II.

Table II

| Catalyst | C | D | E |
|---|---|---|---|
| Starting Temperature, °C | 27.5 | 29.0 | 25.0 |
| Maximum Temperature, °C | 34.0 | 35.0 | 28.0 |
| Pressure, p. s. i. | 415 | 405 | 400 |
| Wt. Charge | 204.4 | 203 | 203 |
| Wt. Liquid Product | 41.3 | 44.5 | 16.4 |
| Liquid Product Percent Yield Based on Olefins Charged | 141.9 | 163.6 | 60.7 |

These results show that the catalysts prepared from the halogen substituted phosphoric acids are superior to those prepared from non-halogen substituted phosphoric acids.

EXAMPLE VIII

Ten grams of $AlCl(HPO_3F)_2$ is charged to a rotating autoclave. 100 grams of normal pentane is also charged to the autoclave. The contents of the autoclave are agitated to a temperature of 200° C. for a period of two hours after which the autoclave is opened and the contents are discharged. An analysis of the hydrocarbon portion shows that the treatment produces a substantial yield of isopentane and very little conversion to heavier or lighter products. This example illustrates the use of the catalysts as isomerization catalysts.

EXAMPLE IX

Ten grams of $AlCl_2SO_3F$ is charged to a rotating autoclave with 100 grams of a mixture of equal parts of propylene and propane. The autoclave is sealed and the contents heated to a temperature of 116° C. and maintained at this temperature for a period of two hours. After the two hour period the autoclave is opened, the contents discharged, and the hydrocarbon phase separated from the catalyst phase. An analysis of the mixture shows that a substantial portion of the propylene is converted to higher boiling normally liquid material.

I claim as my invention:

1. A catalyst having the general formula $AlCl_n(R)_{3-n}$, wherein $n$ is an integer less than 3 and R is a halogen substituted inorganic acid radical, said catalyst being substantially free of uncombined aluminum chloride.

2. The catalyst of claim 1 further characterized in that said halogen comprises fluorine.

3. The catalyst of claim 1 further characterized in that said halogen comprises chlorine.

4. The catalyst of claim 1 further characterized in that said halogen substituted inorganic acid radical comprises a halogen substituted sulfuric acid radical.

5. The catalyst of claim 1 further characterized in that said halogen substituted inorganic acid radical comprises a halogen substituted phosphoric acid radical.

6. A catalyst prepared by metathetically reacting at least equimolecular proportions of a halogen substituted inorganic acid with aluminum chloride to produce said catalyst under conditions whereby hydrogen chloride is eliminated.

7. A catalyst prepared by metathetically reacting at least equimolecular proportions of a chlorosulfonic acid with aluminum chloride to produce said catalyst under conditions whereby hydrogen chloride is eliminated.

8. A catalyst prepared by metathetically reacting at least equimolecular proportions of a fluosulfonic acid with aluminum chloride to produce said catalyst under conditions whereby hydrogen chloride is eliminated.

9. A catalyst prepared by metathetically reacting at least equimolecular proportions of a fluoboric acid with aluminum chloride to produce said catalyst under conditions whereby hydrogen chloride is eliminated.

10. A catalyst prepared by metathetically reacting at least equimolecular proportions of a fluophosphoric acid with aluminum chloride to produce said catalyst under conditions whereby hydrogen chloride is eliminated.

11. A process characterized by the formation of a carbonium ion which comprises contacting a compound capable of forming a carbonium ion with a carbonium ion acceptor at reaction conditions with a catalyst having the general formula $AlCl_n(R)_{3-n}$, wherein $n$ is an integer less than 3 and R is a halogen substituted inorganic acid radical, said catalyst being substantially free of uncombined aluminum chloride.

12. A polymerization process which comprises contacting polymerizable material at polymerizing conditions with a catalyst having the general formula $AlCl_n(R)_{3-n}$, wherein $n$ is an integer less than 3 and R is a halogen substituted inorganic acid radical, said catalyst being substantially free of uncombined aluminum chloride.

13. An isomerization process which comprises contacting isomerizable material at isomerizing conditions in the presence of a catalyst having the general formula $AlCl_n(R)_{3-n}$, wherein $n$ is an integer less than 3 and R is a halogen substituted inorganic acid radical, said catalyst being substantially free of uncombined aluminum chloride.

14. A process which comprises reacting an alkylatable compound and an olefin-acting compound at alkylating conditions in the presence of a catalyst having the general formula $AlCl_n(R)_{3-n}$, wherein $n$ is an integer less than 3 and R is a halogen substituted inorganic acid radical, said catalyst being substantially free of uncombined aluminum chloride.

15. A process which comprises reacting an alkylatable hydrocarbon and an olefin-acting hydrocarbon at alkylating conditions in the presence of a catalyst having the general formula $AlCl_n(R)_{3-n}$, wherein $n$ is an integer less than 3 and R is a halogen substituted inorganic acid radical, said catalyst being substantially free of uncombined aluminum chloride.

16. A process which comprises reacting an alkylatable hydrocarbon and an olefin-acting hydrocarbon at alkylating conditions in the presence of a catalyst having the general formula $AlCl_2(R)$, wherein R is a halogen substituted sulfuric acid radical said catalyst being substantially free of uncombined aluminum chloride.

17. A process which comprises reacting an alkylatable hydrocarbon and an olefin-acting hydrocarbon at alkylating conditions in the presence of a catalyst having the general formula $AlCl_2(R)$, wherein R is a halogen substituted phosphoric acid radical said catalyst being substantially free of uncombined aluminum chloride.

18. A process which comprises reacting an isoparaffin and an olefin at alkylating conditions with a catalyst comprising the reaction product of aluminum chloride and chlorosulfonic acid, said catalyst being substantially free of uncombined aluminum chloride and prepared by metathetical reaction of aluminum chloride with said chlorosulfonic acid with the elimination of hydrogen chloride.

19. A process which comprises reacting an isoparaffin and an olefin at alkylating conditions with a catalyst comprising the reaction product of aluminum chloride and fluophosphoric acid said catalyst being substantially free of uncombined aluminum chloride and prepared by metathetical reaction of aluminum chloride with said fluorophosphoric acid with the elimination of hydrogen chloride.

20. The catalyst of claim 1 further characterized in that R is $-OSO_2F$.

21. The catalyst of claim 1 further characterized in that R is $-OPOF_2$.

22. The catalyst of claim 1 further characterized in that R is $-OP(OH)OF$.

References Cited in the file of this patent
UNITED STATES PATENTS

| | | |
|---|---|---|
| 2,240,583 | Sparks et al. | May 6, 1941 |
| 2,245,734 | Subkow | June 17, 1941 |
| 2,358,011 | Ipatieff et al. | Sept. 12, 1944 |
| 2,376,508 | Sachanen et al. | May 22, 1945 |
| 2,467,326 | Mavity | Apr. 12, 1949 |
| 2,469,335 | Johnson et al. | May 3, 1949 |
| 2,646,452 | Schmerling | July 21, 1953 |